United States Patent [19]

Knüdel

[11] Patent Number: 4,532,741
[45] Date of Patent: Aug. 6, 1985

[54] WINDOW PANE MOUNTING FOR VEHICLES

[75] Inventor: Günter Knüdel, Wolfsburg, Fed. Rep. of Germany

[73] Assignee: Volkswagenwerk Aktiengesellschaft, Wolfsburg, Fed. Rep. of Germany

[21] Appl. No.: 644,546

[22] Filed: Aug. 27, 1984

[30] Foreign Application Priority Data

Sep. 7, 1983 [DE] Fed. Rep. of Germany ....... 3332233

[51] Int. Cl.$^3$ ............................................. B60J 1/00
[52] U.S. Cl. ........................................ 52/99; 52/397; 52/208; 52/127.1; 296/201; 296/93
[58] Field of Search ............... 52/397, 127.1, 400, 52/98, 99, 208; 296/201, 93; 220/279, 280

[56] References Cited

U.S. PATENT DOCUMENTS

| 539,545 | 5/1895 | Ritter | 220/280 |
| 3,182,423 | 5/1965 | Jennings | 52/127.1 |
| 3,430,394 | 3/1969 | Johnston | 52/127.1 |
| 3,474,586 | 10/1969 | Hoverman, Jr. | 52/400 |
| 3,802,143 | 4/1974 | Adler et al. | 52/400 |
| 4,270,792 | 6/1981 | Mathieson et al. | 296/93 |
| 4,438,609 | 3/1984 | Nielson et al. | 52/208 |

FOREIGN PATENT DOCUMENTS

| 2120055 | 4/1971 | Fed. Rep. of Germany . |
| 2520320 | 12/1975 | Fed. Rep. of Germany . |
| 3036058 | 4/1981 | Fed. Rep. of Germany . |
| 3215892 | 11/1983 | Fed. Rep. of Germany . |
| 1348981 | 3/1974 | United Kingdom ................... 52/400 |

Primary Examiner—Henry E. Raduazo
Assistant Examiner—Caroline Dennison
Attorney, Agent, or Firm—Brumbaugh, Graves, Donohue & Raymond

[57] ABSTRACT

In the particular embodiment described in the specification, a window pane mounting for a vehicle includes a flange on the vehicle forming a window opening, a cement bead extending between the flange and a window supported in the opening, and a resilient molding mounted on the flange and having a support structure including wire loops embedded in the resilient member joined to wire loops projecting through the cement bead, and a continuous wire joining the portions of the loops projecting through the cement bead so that the cement bead will be severed when the molding is removed from the flange.

1 Claim, 1 Drawing Figure

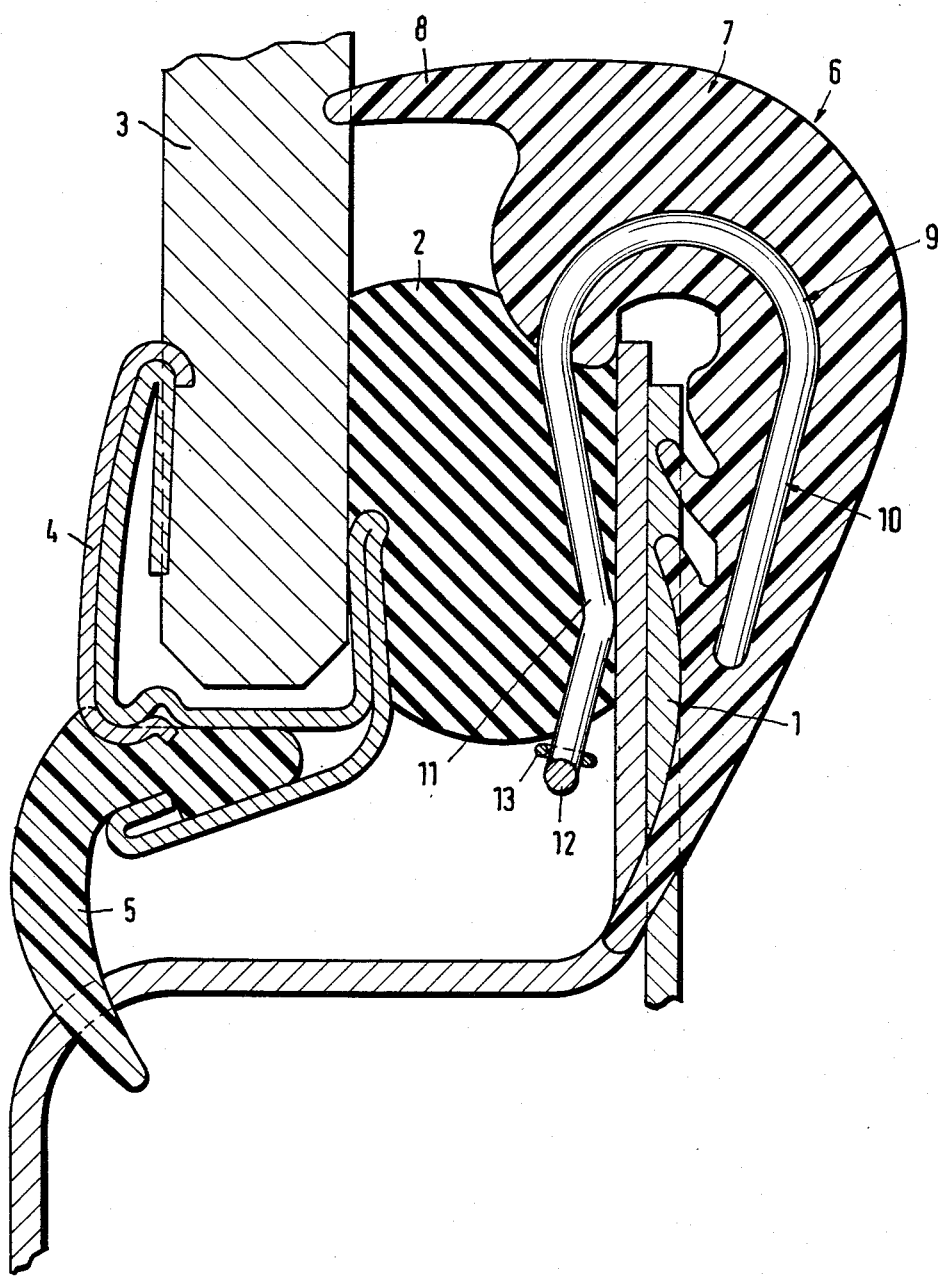

WINDOW PANE MOUNTING FOR VEHICLES

BACKGROUND OF THE INVENTION

This invention relates to window pane mountings for vehicles and, more particularly, to a new and improved window pane mounting which is especially adapted to facilitate removal of the window pane when necessary.

Heretofore, window panes for vehicles have been mounted by providing a bead of cement between a flange of the vehicle body extending approximately parallel to the surface of the pane and bounding an opening to receive the window and an edge section of the pane which faces the flange, and a flexible molding is removably mounted on the flange to cover the joint between the flange and the window pane. In U.S. Pat. No. 4,270,792 for example, a window pane is mounted on the flange of a vehicle by a bead of curable adhesive material confined between the flange and a rubber dam, and the molding is formed with projecting wire loops which embrace an adjacent portion of the flange and project into the region of the cement bead so as to be enveloped by the curable adhesive material when the window is mounted on the flange.

When a window mounted in this manner is to be replaced, the molding is stripped from the flange, pulling the wire loops from the adhesive material but leaving the main body of the adhesive material intact, and thereby requiring substantial force or the use of a cutter or adhesive dissolving material to separate the window pane from the frame. U.S. Pat. No. 4,123,100 discloses a weatherstrip sealing arrangement in which a strip of resilient material contains a ladder-shaped assembly of deformable metal strips connected between continuous cords at their opposite ends, the ladder being embedded in a strip of resilient material. That weatherstrip arrangement is applied to a flange without the use of adhesive or mastic material by deforming the metal strips into a U-shape so as to clamp them around the flange while embracing a tubular rubber gasket. Because of the absence of an adhesive, that arrangement does not lend itself to the mounting of a window pane on a vehicle.

Accordingly, it is an object of the present invention to provide a new and improved window pane mounting for a vehicle utilizing a cement joint between the window pane and a vehicle flange by which the cement joint can be seperated in a simple and convenient manner when it is necessary to remove the window pane from the vehicle.

SUMMARY OF THE INVENTION

In accordance with the invention, a window pane mounting includes a cement bead between a window pane and a vehicle flange and a removable molding mounted on the flange includes a support framework having projections extending through the cement bead along with a connecting device joining the ends of the projections on the opposite side of the cement bead. Removal of the molding by successively pulling one projection after the other through the cement bead completely severs the bead and permits easy removal of the window pane from the frame without requiring additional tools.

Further objects and advantages of the invention will be apparent from a reading of the following description in conjunction with the single accompanying drawing which is a schematic cross-sectional view illustrating the arrangement of a representative window pane mounting in accordance with the present invention.

DESCRIPTION OF PREFERRED EMBODIMENT

In the typical embodiment of the invention illustrated in the drawing, a flange 1 of a vehicle body forms a frame for a window pane 3 which is affixed to the flange by a cement bead 2. The window pane 3 has a surrounding frame 4 in which a resilient molding 5 is mounted to as to engage the frame 1 of the vehicle body.

A weatherstrip 6 comprising a resilient member 7 formed with a sealing lip 8 which engages the window pane 3 has a partially embedded support structure 9 consisting of a continuous wire formed into a succession of loops and bent into a U-shape so as to embrace the flange 1. Thus, the portion 10 of the wire member 9, which is embedded within the resilient member 7, consists of a series of adjacent loops which are joined by adjacent loops in a section 11 which projects from the member 7 on the opposite side of the flange 1 and extends through the cement bead 2.

In the drawing, the end 12 of one of the loops in the portion 11 is illustrated in section to indicate that it projects upwardly from the plane of the drawing to form the remainder of the loop before passing back into the resilient body 7. In this way, the support structure for the weatherstrip 6 is provided with wire members 11 extending parallel to the direction in which the weatherstrip is mounted on or removed from the flange 1.

In accordance with the invention, the projecting ends 12 of each of the members 11 are joined by a thin flexible connecting wire having at least one filament, which is woven through the successive loops 11 of the support 9. Accordingly, if the window pane 3 is to be removed from the vehicle, the weatherstrip 6 is pulled away from the flange 1, causing the legs of successive loops 11, which are embedded in the cement 2, to pull through the cement and carry with them the wire 13 which completely severs the cement bead as the weatherstrip is withdrawn from the flange.

Although the invention has been described herein with reference to a specific embodiment, many modifications and variations therein will readily occur to those skilled in the art. For example, the invention may be used to mount a pane in the frame for a pivoting window as well as window panes which are fixed in the vehicle frame, such as windshields and rear windows. Accordingly, all such variations and modifications are included within the intended scope of the invention as defined by the following claim.

I claim:

1. A window pane mounting for a vehicle comprising:
   a flange extending approximately parallel to the adjacent surface of a window pane and forming a window opening;
   a cement bead disposed between the flange and the adjacent surface of the window pane to support the window pane;
   a resilient molding mounted on the flange and having support elements projecting through the cement bead to the opposite side thereof; and
   a flexible wire joining the portions of the projecting elements on the opposite side of the cement bead.

* * * * *